United States Patent
Seibold

(10) Patent No.: US 10,781,564 B2
(45) Date of Patent: Sep. 22, 2020

(54) RAKE FOR PICKING UP ANIMAL WASTE

(71) Applicant: Lee Paris Seibold, Fort Wayne, IN (US)

(72) Inventor: Lee Paris Seibold, Fort Wayne, IN (US)

( * ) Notice: Subject to any disclaimer, the term of this patent is extended or adjusted under 35 U.S.C. 154(b) by 0 days.

(21) Appl. No.: 16/426,422

(22) Filed: May 30, 2019

(65) Prior Publication Data
US 2019/0390421 A1    Dec. 26, 2019

Related U.S. Application Data

(60) Provisional application No. 62/652,874, filed on Apr. 4, 2018.

(51) Int. Cl.
*E01H 1/12* (2006.01)
*A01D 7/06* (2006.01)

(52) U.S. Cl.
CPC ............. *E01H 1/1206* (2013.01); *A01D 7/06* (2013.01)

(58) Field of Classification Search
CPC .. E01H 1/1206; E01H 2001/1293; A01D 7/06
USPC ..... 294/1.4, 50.6; 56/400.11, 400.12, 400.21
See application file for complete search history.

(56) References Cited

U.S. PATENT DOCUMENTS

| | | | |
|---|---|---|---|
| 827,542 A * | 7/1906 | Lawson | |
| 1,142,127 A * | 6/1915 | Townsned | A01D 7/00 56/400.15 |
| 2,045,394 A * | 6/1936 | Kuhlman | A01D 7/02 56/400.16 |
| 2,076,120 A * | 4/1937 | Cyganick | A01G 20/30 172/375 |
| 3,688,483 A * | 9/1972 | Hamilton | A01D 7/10 56/400.11 |
| 3,979,146 A * | 9/1976 | Berg | E01H 12/00 209/418 |
| 4,958,871 A * | 9/1990 | Hemans | E01H 1/1206 15/257.1 |
| 5,921,596 A * | 7/1999 | Sheriff | B07B 1/02 209/418 |
| 6,012,748 A * | 1/2000 | Franks | E01H 1/1206 294/1.4 |
| 6,030,011 A * | 2/2000 | Layton | E01H 1/1206 15/257.4 |
| 8,544,906 B2 * | 10/2013 | Northrop | E01H 1/1206 294/1.4 |

(Continued)

*Primary Examiner* — Dean J Kramer
(74) *Attorney, Agent, or Firm* — Askew Intellectual Property, LLC

(57) ABSTRACT

A Rake for Picking up Animal Waste includes a bow connected to a handle. A waste receiving structure is connected to the bow. The waste receiving structure has a rearward facing leading edge. The bow describes an opening above the rearward facing leading edge through which animal waste may pass. The waste receiving structure may be embodied as multiple tines, or as a receptacle. The rake is configured so that waste is propelled onto the upper surface of the waste receiving structure as the rake is pulled rearwardly by a user in a sweeping motion. In an embodiment having tines, the tines may be provided with a recurve to prevent waste from falling off the tines. In an embodiment having a receptacle, the receptacle may be provided with a weighted plate to assist in penetrating deeply into turf.

12 Claims, 12 Drawing Sheets

(56) References Cited

U.S. PATENT DOCUMENTS

| | | | | |
|---|---|---|---|---|
| 8,955,893 B1* | 2/2015 | Stern | ............... | E01H 1/1206 |
| | | | | 294/1.4 |
| 9,347,192 B1* | 5/2016 | Smith | ............... | E01H 1/1206 |
| 2014/0059999 A1* | 3/2014 | Harris | ............... | A01D 7/10 |
| | | | | 56/400.11 |

* cited by examiner

RAKE FOR PICKING UP ANIMAL WASTE

CROSS-REFERENCE TO RELATED APPLICATIONS

The present application claims priority to U.S. Provisional No. 62/652,874, filed Apr. 4, 2018, the entire contents of all of which are herein incorporated by reference.

BACKGROUND

Field of Invention

Embodiments described herein generally relate to a rake for picking up animal waste, and more particularly to rake that is operated in a pulling motion wherein the waste enters the rake from the back side and is retained on the top side of the body or tines of the rake, rather than in a pushing motion wherein the waste enters the rake from the front side atop the tines.

Background of the Invention

Pet animals such as dogs commonly defecate in yards and other locations where their waste must be picked up and disposed of. In order for pet owners to accomplish this without making direct contact with the waste, a plethora of scooping devices of various designs are available on the market. One common type of scooping device uses two handles hingedly engaged at mid-length, each having a half-shell arrangement at the lower end. In use, the operator manipulates the upper ends of the two handles in order to cause the two half-shells to capture the waste in between. Operating this type of scooping device requires coordinated two-handed operation, and often results in capture of grass and other debris along with the waste, so that the grass gets torn up when the waste is lifted away.

Another common type of scooping device uses a tray or bin at the lower end of a handle, while another rake implement is used to pull the waste into the tray or bin. When lifted, the tray or bin may pivot about the lower end of the handle, so that the waste falls further into the tray or bin. Alternately, the tray or bin may be fixedly attached to the lower end of the handle. In either case, the rake implement that is used to pull the waste into the tray or bin is a common, if diminutive, type of rake having downward pointing flexible tines. When this type of rake is drawn in the handle-first direction through the grass, the waste often rolls under the tines and is broken up or smeared, resulting in inefficient and messy operation.

Another type of scooping device uses stiffer pitchfork style tines, which are pushed tine-first through the grass. Variations of this type of scooping device may be arranged with the tines angled forward of the handle, so that the tines are pushed forward by the operator pushing forward on the handle, or may be arranged with the tines at a lateral angle from the handle, so that the tines are pushed forward by the operator pushing sideways on the handle. In either case, the operator must attempt to direct the tines beneath the waste without penetrating or catching on the ground surface.

Accordingly, there is an unmet need for a device for removing animal waste that is simple and easy to use, that does not damage turf, that does not break up or smear the waste material, and that does not require user coordination in order to get beneath the waste without penetrating or catching on the ground surface.

SUMMARY

Embodiments described herein relate to a Rake for Picking up Animal Waste, wherein the rake is pulled by the user rearwardly in the direction of the handle. Rather than engaging the animal waste with the tines of the rake above the waste or with the tines being pushed forwardly beneath the waste, the rake is configured so that the waste enters the rake from the direction of the base of the tines where they connect to a rearward facing leading edge. The rearward facing leading edge is connected to the rake handle by way of a bow that is connected to a socket into which the handle is inserted. The bow, therefore, describes an opening above the rearward facing leading edge through which the waste may pass.

In this way, the Rake for Picking up Animal Waste may be comfortably manipulated by the user in a pulling or sweeping motion. The rake as it is being pulled rather than pushed through the turf, tends to ride along the surface of the ground instead of catching or digging in. By controlling the amount of down pressure on the rake handle, the user controls how deeply the rearward facing leading edge penetrates the turf. The animal waste tends to be suspended somewhat above the actual ground surface by the turf, which cooperates with the rearward facing leading edge to propel the waste onto the top side of the tines of the rake as the rake is pulled rearwardly. In one embodiment, a recurve in the tines prevents the waste from falling off of the top sides of the tines of the rake, while the space between the tines and the tines themselves cooperate to clean any residual waste from the turf.

In another embodiment, a receptacle is connected to the bow, so that the receptacle has a rearward facing leading edge that is pulled rearwardly. The waste then enters the receptacle from the rear beneath the bow and above the rearward facing leading edge, and is prevented from falling out of the receptacle by the receptacle sides. In this embodiment, the receptacle may be provided with a weighted plate that is attached to the receptacle bottom, so that the receptacle does not ride up too far on the surface of the turf to accomplish its objective. The weighted plate may be attached to the receptacle bottom, for non-limiting example, using thermoplastic staking. In either embodiment, the waste may be disposed of by inverting the Rake for Picking up Animal Waste over an appropriate waste disposal.

The tines or receptacle of the Rake for Picking up Animal Waste, along with the bow, socket, and rearward facing leading edge, may be fashioned from metal, plastic, or other material of sufficient durability and toughness. For non-limiting example, the rake may be made of hand-welded 12-gauge steel. The various components may all be made of the same material, or may be made of different materials according to need. For example, an embodiment having a receptacle made from plastic may have a rearward facing leading edge constructed of hardened steel and a weighted plate constructed of regular steel. Similarly, the handle may be fashioned from wood, fiberglass, metal, plastic, or any other material of appropriate strength and toughness. The surfaces of the tines or receptacle, bow, socket, and/or leading edge of the Rake for Picking up Animal Waste may be provided with a non-stick surface such as anodized aluminum, ceramic, silicone, enamel, or polytetrafluoroethylene (PTFE).

According to one embodiment of the Rake for Picking up Animal Waste, a bow is connected to a handle. A waste receiving structure is connected to the bow. The waste receiving structure has a rearward facing leading edge. The bow describes an opening above the rearward facing leading edge through which animal waste may pass.

According to another embodiment of the Rake for Picking up Animal Waste, a Device is adapted to be connected to a handle. The device includes a bow connected to a socket. A waste receiving structure is connected to the bow. The waste receiving structure has a rearward facing leading edge. The bow describes an opening above the rearward facing leading edge through which animal waste may pass.

Because embodiments of the Rake for Picking up Animal Waste are operated by pulling them rearwardly rather than by propelling them tines-first through the turf, and because the waste enters embodiments of the rake from above the tines or above the receptacle rather than being pulled along beneath the tines or pushed into the receptacle, embodiments of the Rake for Picking up Animal Waste work on many different kinds of surfaces, including but not limited to short grass, tall grass, patching grass, artificial turf, bare soil, hard surfaces, and etcetera. Further, because embodiments of the Rake for Picking up Animal Waste are operated by pulling them rearwardly rather than by propelling them tines-first through the turf, and because the waste enters embodiments of the rake from above the tines or above the receptacle rather than being pulled along beneath the tines or pushed into the receptacle, embodiments of the Rake for Picking up Animal Waste are easier and more comfortable to operate, and more efficiently accomplish the purpose or removing animal waste without wasted and repetitive motion by the user.

Embodiments of the Rake for Picking up Animal Waste may be sized to pick up waste originating from various species of animals, from farm animals to household pets. Specifically, the size and length of the tines in an embodiment so provided may be varied as necessary, along with the width of the gaps between the tines. For non-limiting example, for waste originating from dogs, the tines may be provided with ½ inch spacing therebetween. Similarly, the size of the bow and overall area of the tines or receptacle may be sized appropriately for the type of animal waste being picked up.

BRIEF DESCRIPTION OF THE DRAWINGS

The above-mentioned and other features of embodiments of the Rake for Picking Up Animal Waste, and the manner of their working, will become more apparent and will be better understood by reference to the following description of embodiments of the Rake for Picking Up Animal Waste taken in conjunction with the accompanying drawings, wherein.

Corresponding reference numbers indicate corresponding parts throughout the several views. The exemplifications set out herein illustrate embodiments of the Rake for Picking up Animal Waste, and such exemplifications are not to be construed as limiting the scope of the claims in any manner.

DETAILED DESCRIPTION

The following detailed description and appended drawing describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
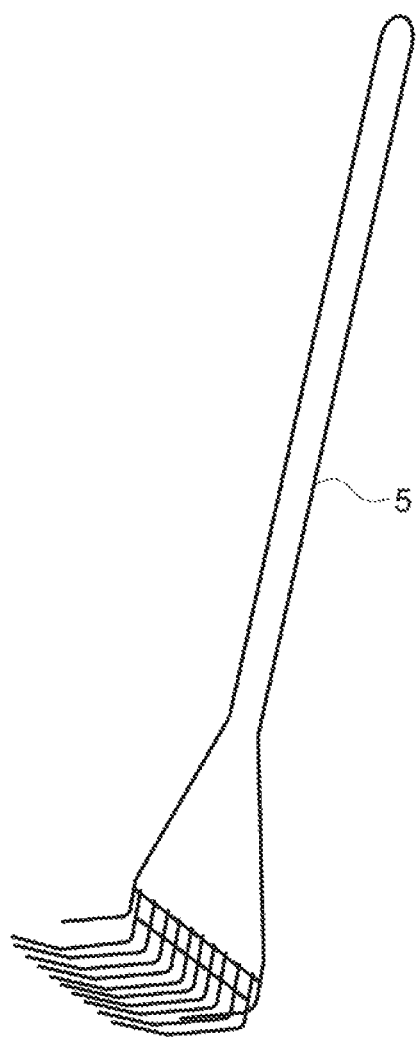
FIG. 1 is a view of a prior art device for picking up animal waste, as described herein.
Figure 2:
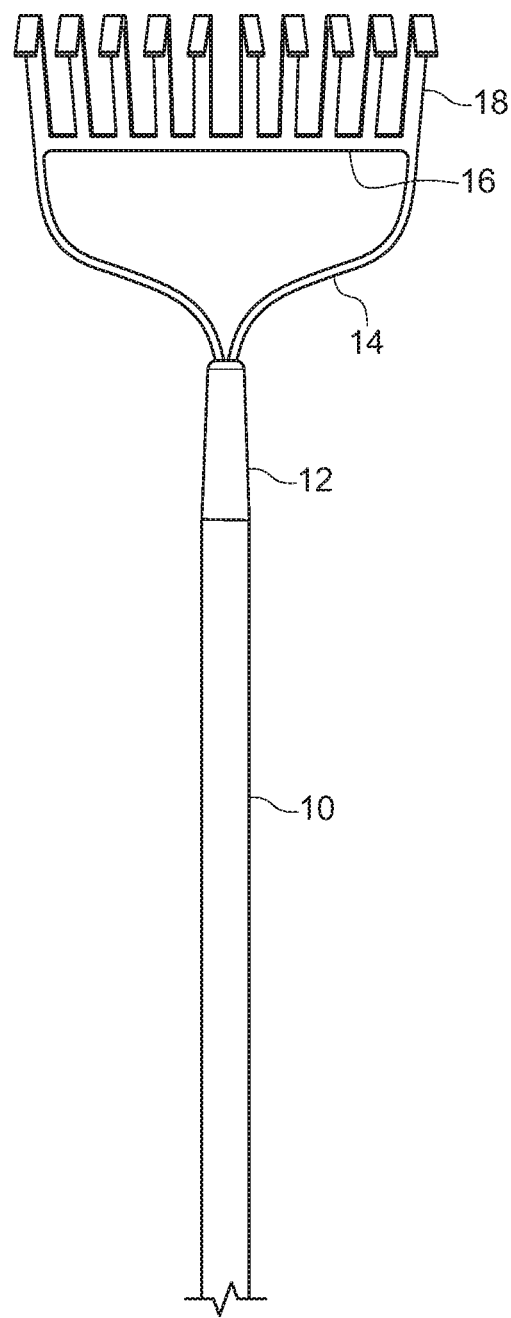
FIG. 2 is a front view of a first exemplary embodiment of the Rake for Picking Up Animal Waste, as described herein.
Figure 3:
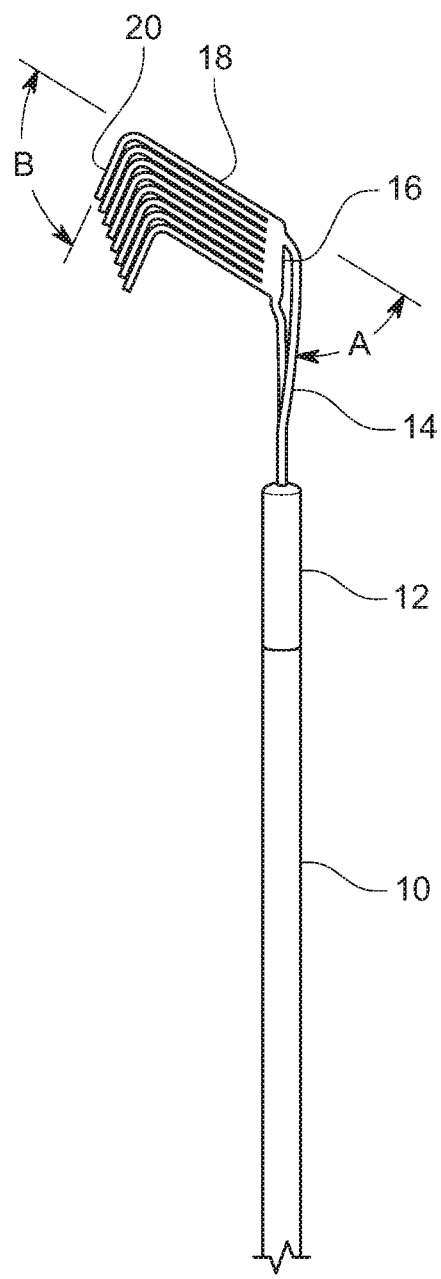
FIG. 3 is a side view of the first exemplary embodiment of the Rake for Picking Up Animal Waste, as described herein.
Figure 4:
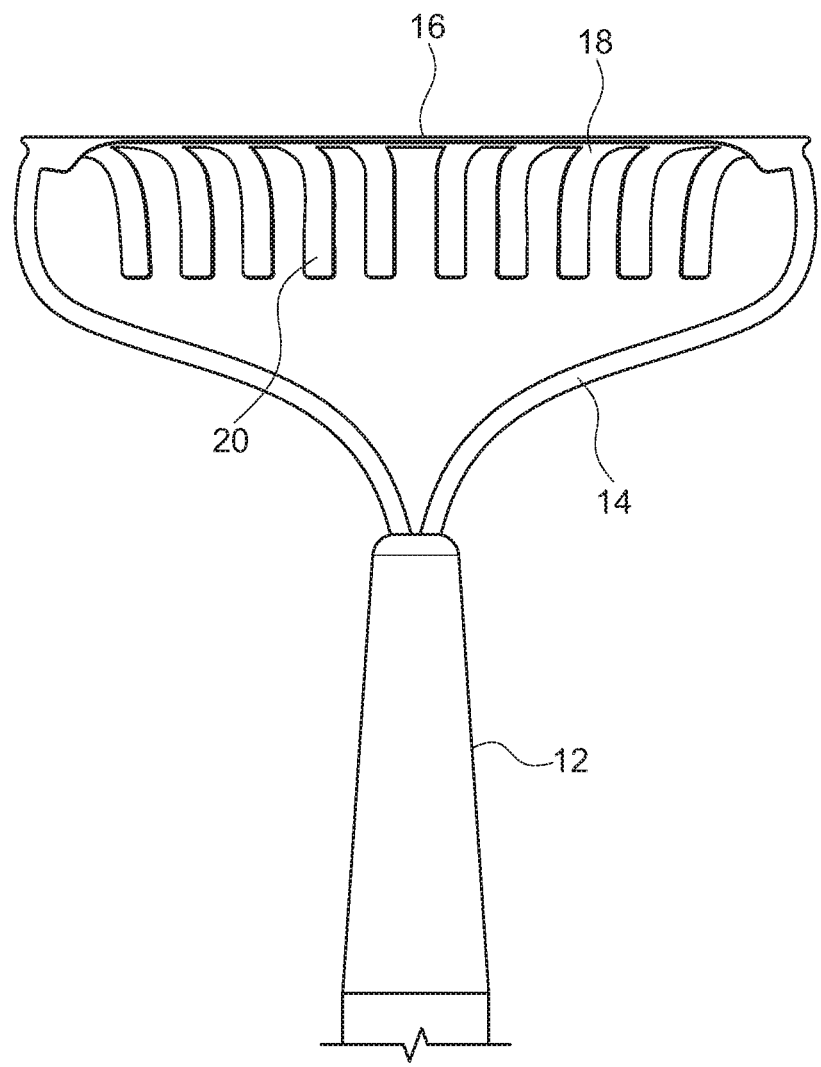
FIG. 4 is a partial rear view of the first exemplary embodiment of the Rake for Picking Up Animal Waste, as described herein.
Figure 5:
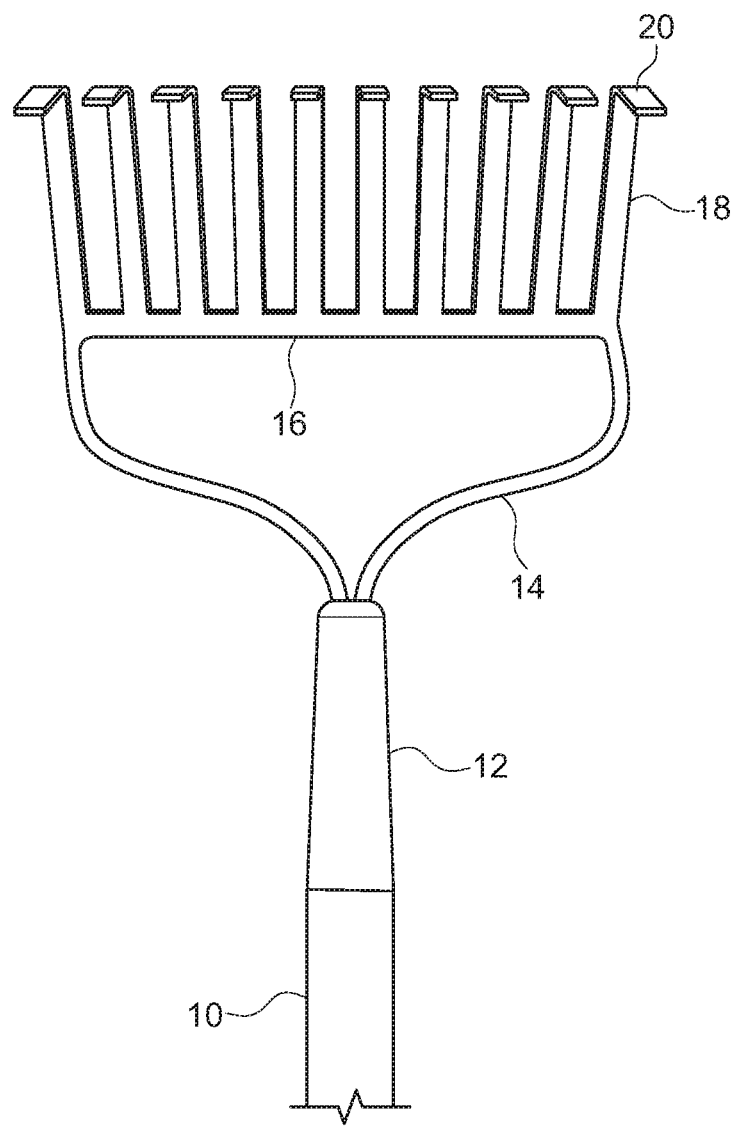
FIG. 5 is a partial front view of the first exemplary embodiment of the Rake for Picking Up Animal Waste, as described herein.
Figure 6:
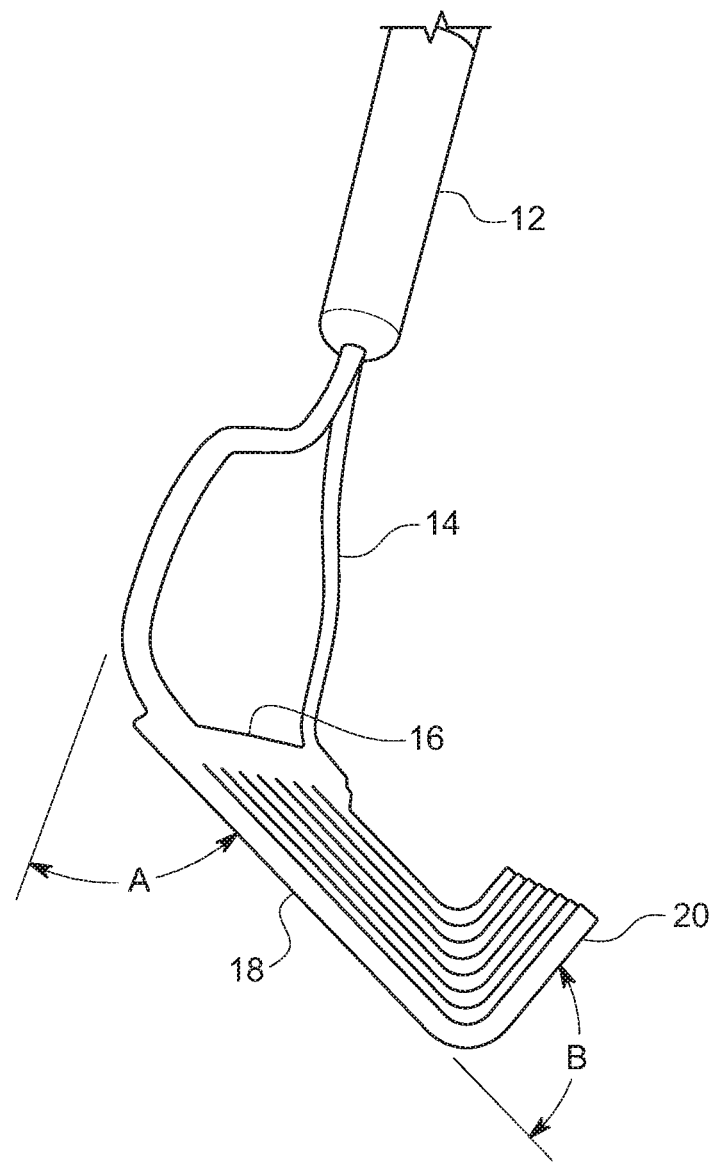
FIG. 6 is a partial isometric side view of the first exemplary embodiment of the Rake for Picking Up Animal Waste, as described herein.
Figure 7:
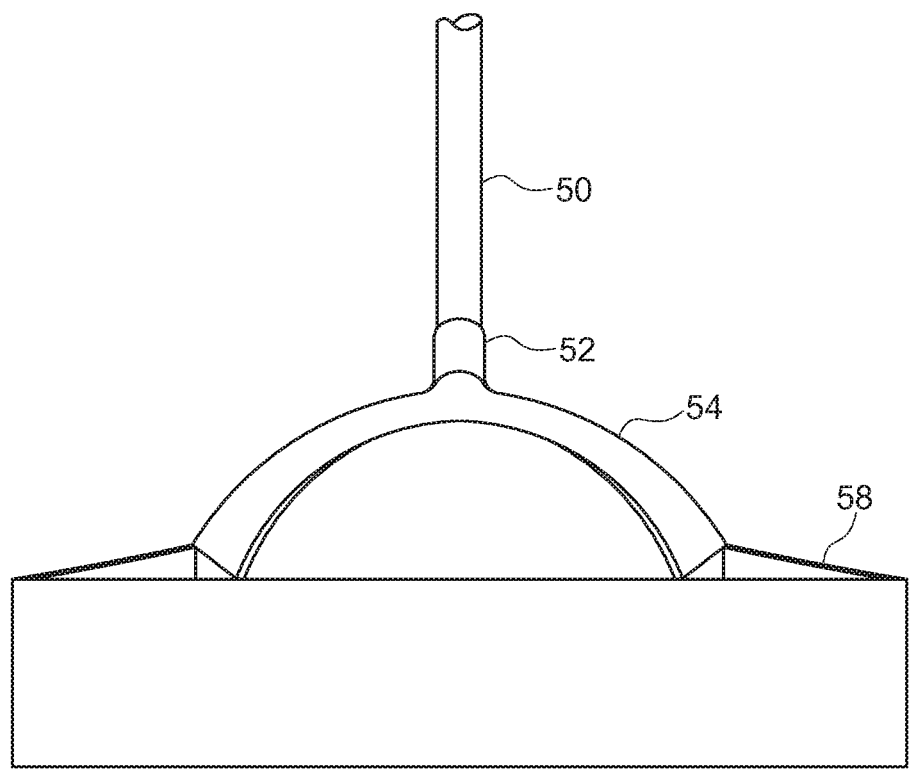
FIG. 7 is a front view of a second exemplary embodiment of the Rake for Picking Up Animal Waste, as described herein.

Turning now to FIG. 1, a known animal waste scooping device 5 is shown. The known animal waste scooping device 5 is arranged with forward facing tines that must be propelled forward through the turf in order to engage and pick up pet waste. As a result, the forward facing tines may catch on the turf and/or may spear the animal waste, making its subsequent removal difficult and messy. Alternately, the known animal waste scooping device 5 may be inverted and repeatedly pulled through the turf so that the waste is moved along before the tines, with the attendant risk that the waste will be broken up or smeared.

Turning now to FIGS. 2 through 6, a first embodiment of a Rake for Picking up Animal Waste according to the present invention is shown. The Rake for Picking up Animal Waste is provided with a rake handle 10 which is engaged to a socket 12, which is in turn connected to a bow 14. The bow 14 is connected to a rearward facing leading edge 16, which is in turn connected to multiple tines 18. The rearward facing leading edge 16 and multiple tines 18 are arranged at an angle "A" from the bow 14, socket 12, and rake handle 10. Angle "A" may be between about 40 and about 60 degrees, preferably between about 45 and about 55 degrees, even more preferably about 50 degrees, "about" being defined as being within normal manufacturing tolerances. The bow 14 and rearward facing leading edge 16 together describe an opening above and forward of the multiple tines 18.

In this way, the Rake for Picking up Animal Waste may be pulled rearward in the direction of the rake handle 10 by a user, while animal waste is propelled onto the upper surface of the multiple tines 18 for later disposal. The multiple tines 18 are provided with a recurve 20, arranged at angle "B" therefrom. Angle "B" may be between about 80 and about 100 degrees, preferably between about 85 and about 95 degrees, even more preferably about 90 degrees, "about" being defined as being within normal manufacturing tolerances. The recurve 20 of the multiple tines 18 function to prevent the animal waste from being propelled off of the upper surface of the multiple tines 18 as the while the spaces between the multiple tines 18 and the multiple tines 18 themselves cooperate to clean any residual waste from the turf.

Figure 8:
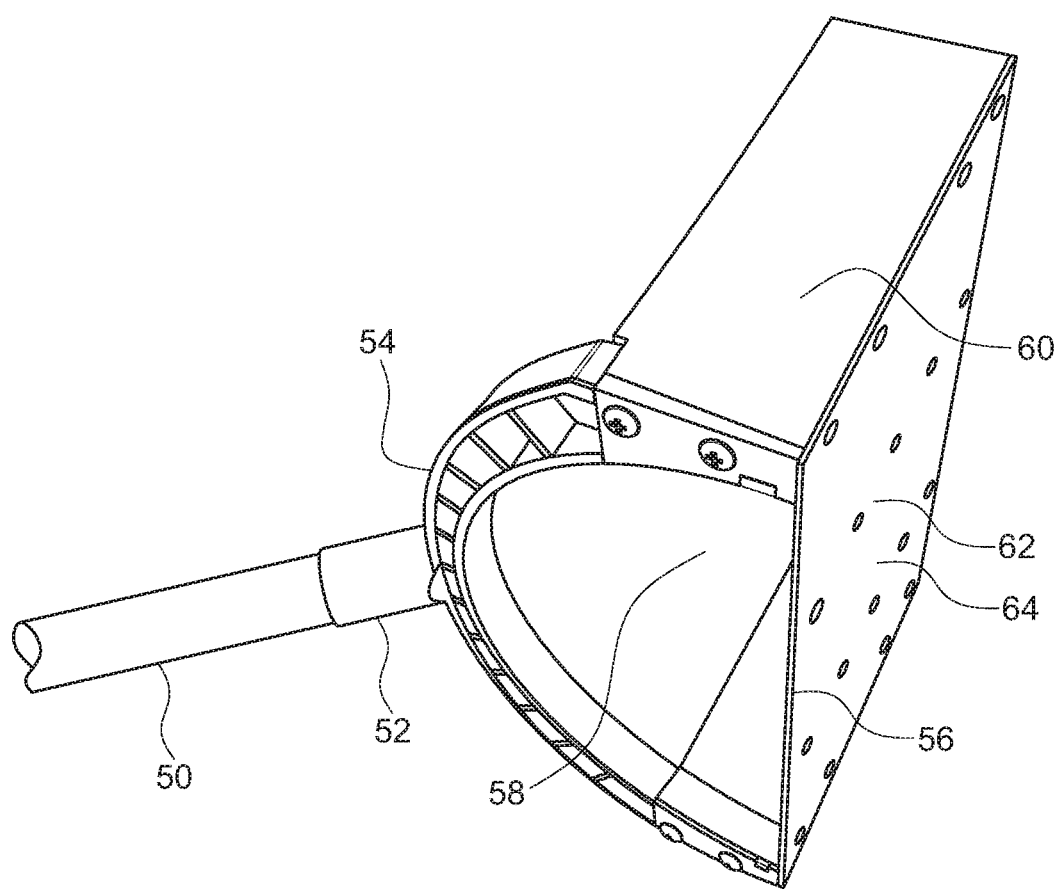
FIG. 8 is a bottom right perspective view of a second exemplary embodiment of the Rake for Picking Up Animal Waste, as described herein.
Figure 9:
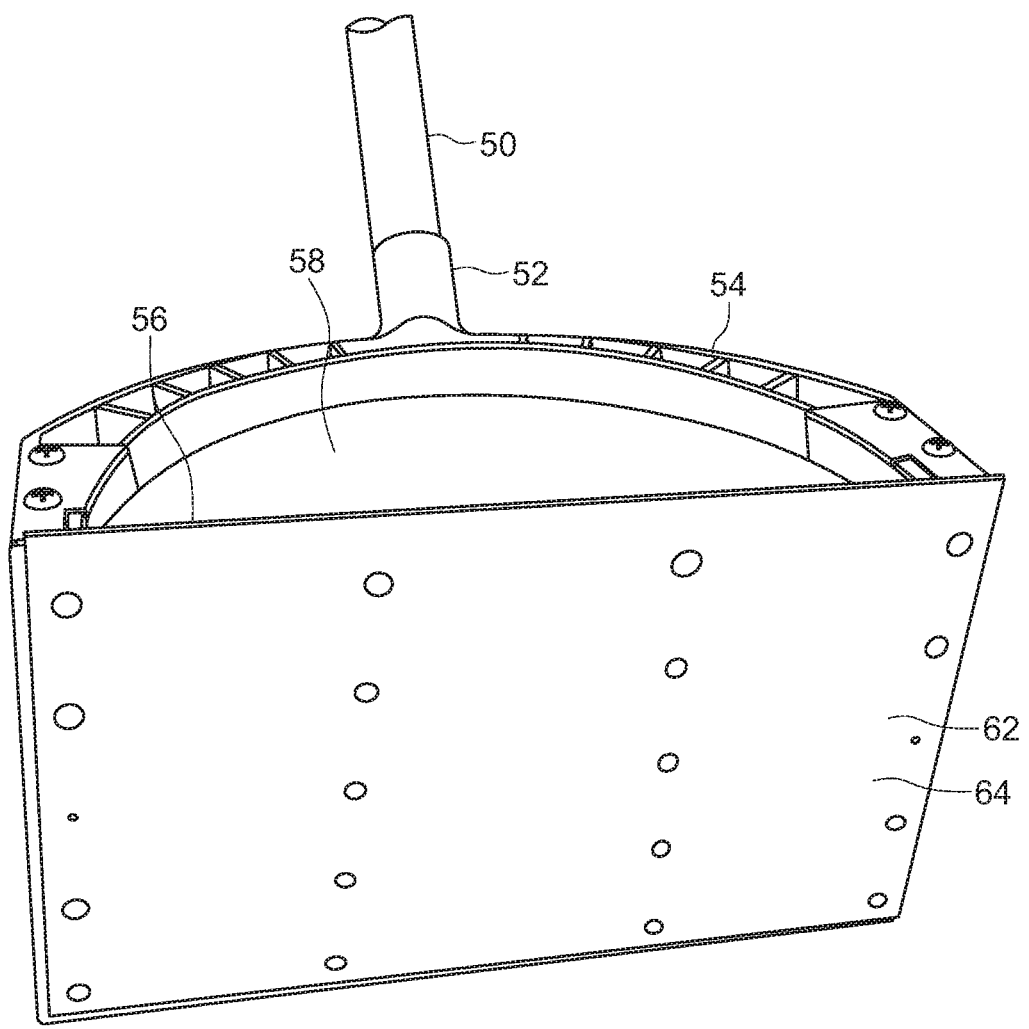
FIG. 9 is a bottom rear perspective view of a second exemplary embodiment of the Rake for Picking Up Animal Waste, as described herein.
Figure 10:
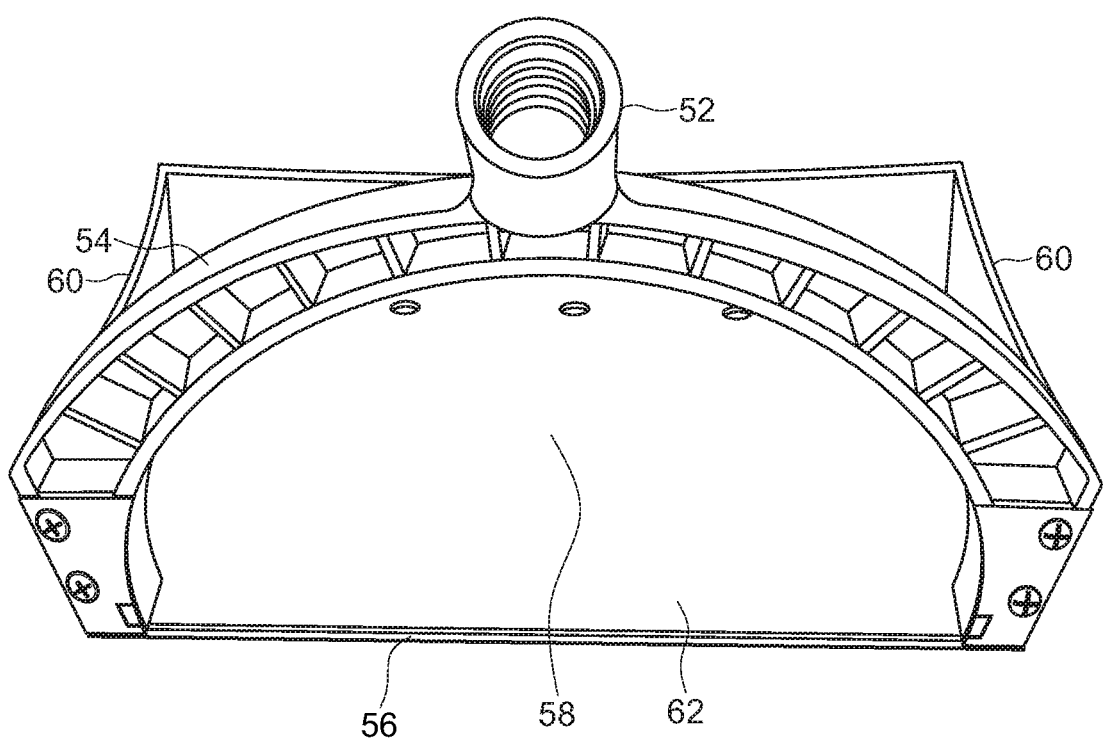
FIG. 10 is a top rear perspective view of a second exemplary embodiment of the Rake for Picking Up Animal Waste, as described herein.
Figure 11:
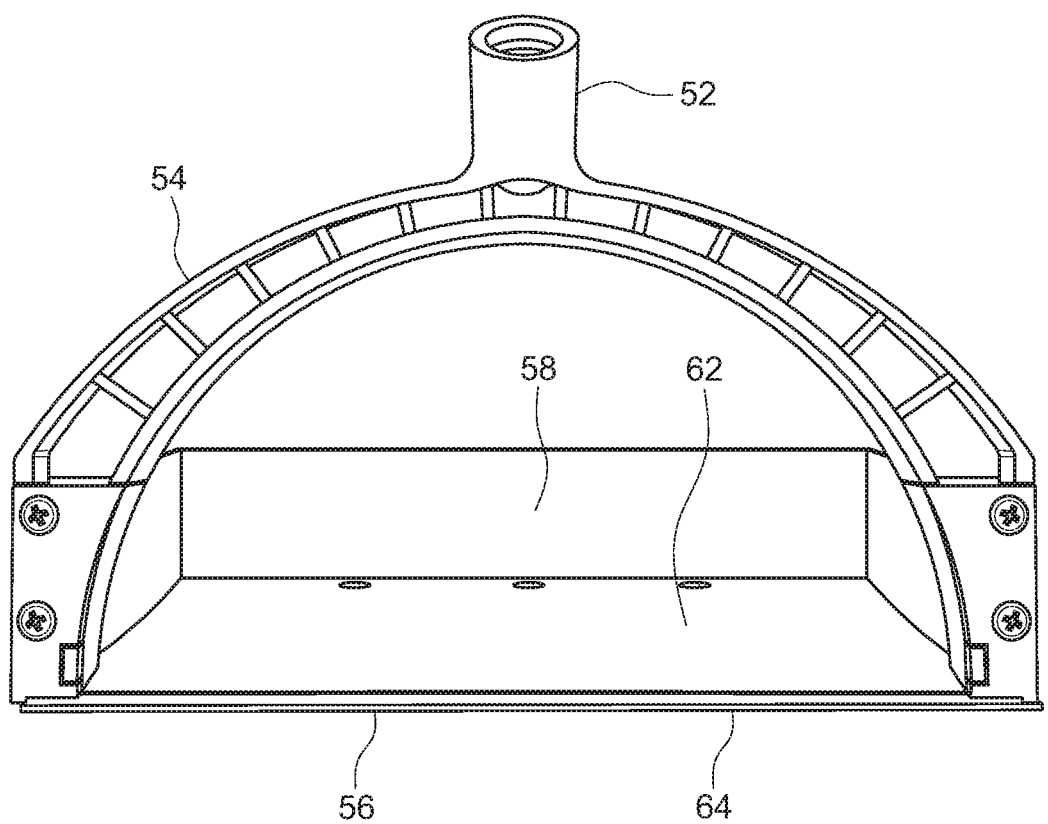
FIG. 11 is a rear view of a second exemplary embodiment of the Rake for Picking Up Animal Waste, as described herein.
Figure 12:
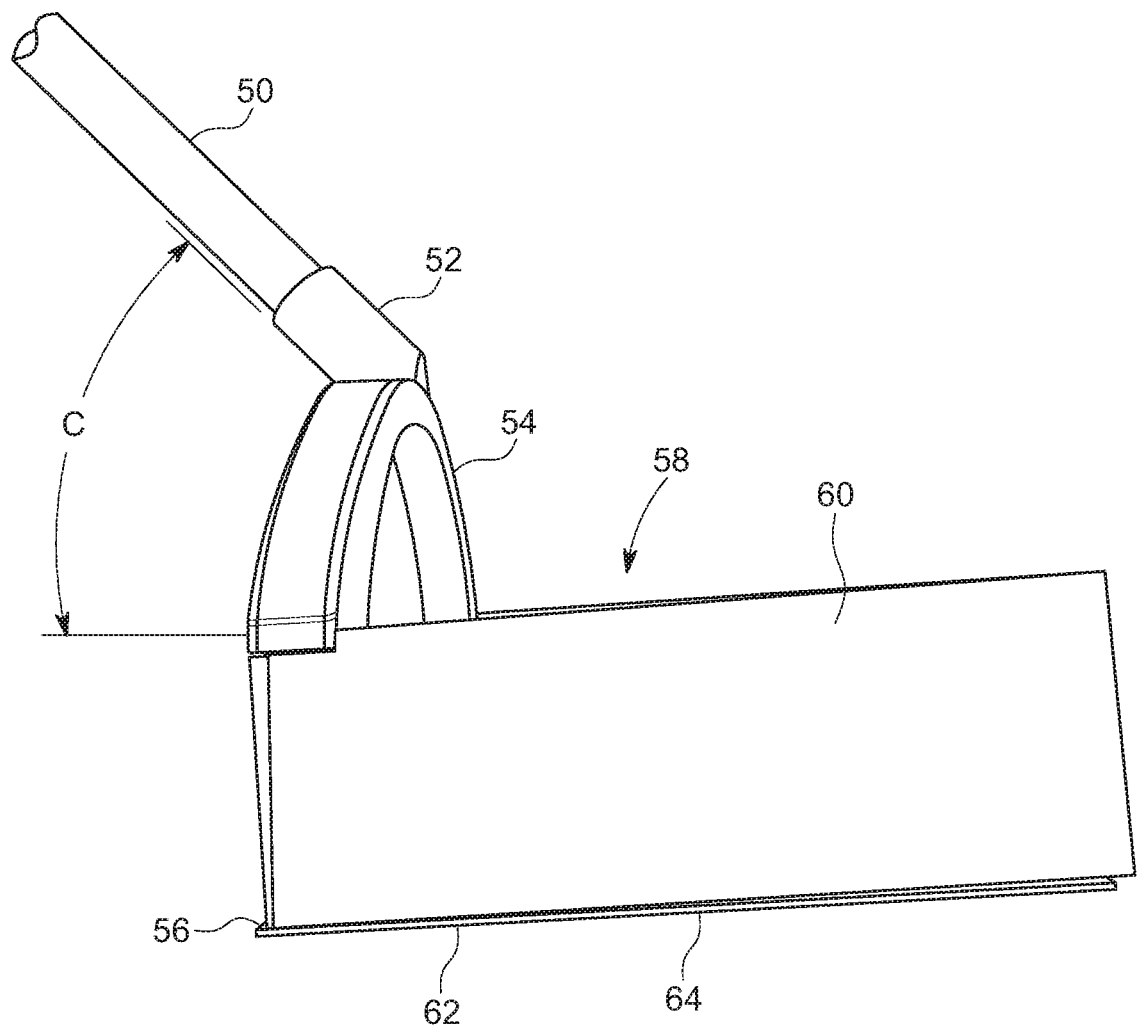
FIG. 12 is a right view of a second exemplary embodiment of the Rake for Picking up Animal Waste, as described herein.

Turning now to FIGS. 7 through 12, a second embodiment of a Rake for Picking up Animal Waste according to the present invention is shown. The Rake for Picking up Animal Waste is again provided with a rake handle 50 which is engaged to a socket 52, which is in turn connected to a bow 54. The bow 54 is connected to a receptacle 58 having receptacle sides 60 and a receptacle bottom 62. The rearward side of the receptacle 58 is open, and the receptacle bottom 62 is provided with a rearward facing leading edge 56, so that the bow 54, the receptacle sides 60, and the rearward facing leading edge 56 together describe an opening above and forward of the receptacle bottom 62. The rake handle 50 and socket 52 are arranged at an angle "C" from the horizontal plane of the receptacle 58, as defined by the receptacle bottom 62. Angle "C" may be between about 35 and about 55 degrees, preferably between about 40 and about 50 degrees, even more preferably about 45 degrees, "about" being defined as being within normal manufacturing tolerances. The receptacle bottom 62 may be provided with a weighted plate 64 that assists in causing the rearward facing leading edge 56 to penetrate sufficiently deeply into turf to assist in its function of picking up animal waste. As shown in FIGS. 8 and 9, the weighted plate 64 may be affixed to the receptacle bottom 62 by way of thermoplastic staking. In this way, the Rake for Picking up Animal Waste may again be pulled rearward in the direction of the rake handle 50 by a user, while animal waste is propelled into the receptacle 58 for later disposal.

While the Rake for Picking up Animal Waste has been described with respect to at least one embodiment, the Rake for Picking up Animal Waste can be further modified within the spirit and scope of this disclosure, as demonstrated previously. This application is therefore intended to cover any variations, uses, or adaptations of the Rake for Picking up Animal Waste using its general principles. Further, this application is intended to cover such departures from the present disclosure as come within known or customary practice in the art to which the disclosure pertains and which fall within the limits of the appended claims.

| REFERENCE NUMBER LISTING | |
|---|---|
| 5 | Known animal waste scooping device |
| 10 | Rake handle |
| 12 | Socket |
| 14 | Bow |
| 16 | Rearward facing leading edge |
| 18 | Multiple tines |
| 20 | Recurve |
| A | Bow angle |
| B | Recurve angle |
| C | Handle angle |
| 50 | Rake handle |
| 52 | Socket |
| 54 | Bow |
| 56 | Rearward facing leading edge |
| 58 | Receptacle |
| 60 | Receptacle sides |
| 62 | Receptacle bottom |
| 64 | Weighted plate |

What is claimed is:

1. A Rake for Picking up Animal Waste, comprising:
   a handle;
   a bow connected to the handle;
   a waste receiving structure connected to the bow, the waste receiving structure having a leading edge proximate to the handle and oriented to be pulled rearward in the direction of the handle by a user, and the bow describing an opening above the leading edge through which animal waste may pass;
   the waste receiving structure further comprising multiple tines extending distally from the direction of the handle;
   the leading edge and the multiple tines being arranged at a fixed angle from the bow and handle, the leading edge having a thickness and the multiple tines having a thickness, the thickness of the leading edge being equal to or less than the thickness of the multiple tines;
   the multiple tines being provided with a recurve arranged to prevent animal waste from being propelled off of an upper surface of the multiple tines; and
   the multiple tines being further arranged to define a flat planar area between the leading edge and the recurve.

2. The Rake for Picking up Animal Waste of claim 1, wherein:
   the leading edge and flat planar area of the multiple tines are arranged at a fixed angle of between about 40 degrees and about 60 degrees from the bow and handle.

3. The Rake for Picking up Animal Waste of claim 2, wherein:
   the leading edge and flat planar area of the multiple tines are arranged at a fixed angle of about 50 degrees from the bow and handle.

4. The Rake for Picking up Animal Waste of claim 1, wherein:
   the recurve being of an angle of between about 80 degrees and about 100 degrees from the flat planar area of the multiple tines.

5. The Rake for Picking up Animal Waste of claim 4, wherein:
   the recurve being of an angle of about 90 degrees from the flat planar area of the multiple tines.

6. The Rake for Picking up Animal Waste of claim 1, wherein:
   the leading edge being made of hardened steel.

7. The Rake for Picking up Animal Waste of claim 1, wherein:
   the waste receiving structure and the leading edge being coated with a nonstick surface.

8. A Device for Picking up Animal Waste adapted to be connected to a handle, comprising:
   a socket;
   a bow connected to the socket;
   a waste receiving structure connected to the bow, the waste receiving structure having a leading edge proximate to the handle and oriented to be pulled rearward in the direction of the handle by a user, and the bow describing an opening above the leading edge through which animal waste may pass;
   the waste receiving structure further comprising multiple tines extending distally from the direction of the handle;
   the leading edge and multiple tines being arranged at a fixed angle from the bow and socket, the leading edge having a thickness and the multiple tines having a thickness, the thickness of the leading edge being equal to or less than the thickness of the multiple tines;

the multiple tines being provided with a recurve arranged to prevent animal waste from being propelled off of an upper surface of the multiple tines; and the multiple tines being further arranged to define a flat planar area between the leading edge and the recurve.

9. The Device of claim 8, wherein:

the leading edge and flat planar area of the multiple tines are arranged at a fixed angle of about 50 degrees from the bow and socket.

10. The Device of claim 9, wherein:

the recurve being of an angle of about 90 degrees from the flat planar area of the multiple tines.

11. The Device of claim 8, wherein:

the leading edge being made of hardened steel.

12. The Device of claim 8, wherein:

the waste receiving structure and the leading edge being coated with a nonstick surface.

\* \* \* \* \*